United States Patent
Col et al.

(10) Patent No.: US 6,349,383 B1
(45) Date of Patent: Feb. 19, 2002

(54) SYSTEM FOR COMBINING ADJACENT PUSH/POP STACK PROGRAM INSTRUCTIONS INTO SINGLE DOUBLE PUSH/POP STACK MICROINSTUCTION FOR EXECUTION

(75) Inventors: Gerard M. Col; G. Glenn Henry; Arturo Martin-de-Nicolas, all of Austin, TX (US)

(73) Assignee: IP-First, L.L.C., Fremont, CA (US)

( * ) Notice: Subject to any disclaimer, the term of this patent is extended or adjusted under 35 U.S.C. 154(b) by 0 days.

(21) Appl. No.: 09/151,006

(22) Filed: Sep. 10, 1998

(51) Int. Cl.[7] ............................................. G06F 9/312
(52) U.S. Cl. ........................ 712/226; 712/225; 712/202
(58) Field of Search ................................. 712/202, 209, 712/227, 225, 226

(56) References Cited

U.S. PATENT DOCUMENTS

| | | | | |
|---|---|---|---|---|
| 3,786,432 A | * | 1/1974 | Woods | 365/230 |
| 5,142,635 A | * | 8/1992 | Saini | 712/225 |
| 5,687,336 A | * | 11/1997 | Shen et al. | 712/202 |
| 5,913,047 A | * | 6/1999 | Mahalingaiah et al. | 712/213 |
| 6,026,485 A | * | 2/2000 | O'Connor et al. | 712/226 |

* cited by examiner

Primary Examiner—Richard L. Ellis
(74) Attorney, Agent, or Firm—Richard K. Huffman; James W. Huffman (57) ABSTRACT

An apparatus and method are provided for combining multiple instructions prescribing accesses to a microprocessor stack into a single micro instruction. The apparatus includes a translator and access alignment logic. The translator receives a first stack access instruction and a second stack access instruction from an instruction queue, and decodes them into an associated micro instruction directing the microprocessor to accomplish both accesses prescribed by the stack access instructions during a combined access, wherein the combined access is achieved in a single instruction cycle. The access alignment logic is coupled to the translator and indicates alignment of two data entities within a cache for the combined access. The two stack access instructions are not combined when the access alignment logic indicates that the combination of the data entities is misaligned within the cache.

24 Claims, 6 Drawing Sheets

FIG. 1 (Related Art)

*Microprocessor Employing a Cache*

FIG. 2 (Related Art)

*Two Sequential Cache Lines*

FIG. 3 (Related Art)

FIG. 4 — Double Push/Pop With Alignment Optimization

*Optimized Double Push/Pop* /600

| Cycle | Shadow Stack | Translate | Register |
|---|---|---|---|
| 1 | F0 | *** | *** |
| 2 | F4 | POP EAX | *** |
| 2 | F8 | POP EBX | *** |
| 3 | F8 | *** | POP2 EAX,EBX |
|   |    | *** |    |
| 11 | F4 |   |   |
| 12 | F8 | POP EAX | *** |
| 12 | FB | POP EBX | *** |
| 13 | FB | *** | POP EAX |
| 14 | FB | *** | POP EBX |
|    |    |    | *** |
| 21 | F0 | *** |   |
| 22 | EC | PUSH EAX | *** |
| 22 | E8 | PUSH EBX | *** |
| 23 | E8 | *** | PUSH2 EAX,EBX |
|    |    | *** |    |
| 31 | F4 |   |   |
| 32 | F0 | PUSH EAX | *** |
| 32 | EC | PUSH EBX | *** |
| 33 | EC | *** | PUSH EAX |
| 34 | EC | *** | PUSH EBX |
| 35 | EC | *** | *** |

Annotations (right side): rows 2–3 span "1 cycle"; rows 13–14 span "2 cycles"; rows 22–23 span "1 cycle"; rows 33–34 span "2 cycles".

NOTES:

1. Contents of Shadow Stack column indicate a predicted top-of-stack following successful execution of the adjacent instruction in the Translate column. For example, contents of Cycle 2 row indicate a predicted top-of-stack of F4 following successful execution of the adjacent POP EAX instruction.

FIG. 7
Method for Double Push/Pop

SYSTEM FOR COMBINING ADJACENT PUSH/POP STACK PROGRAM INSTRUCTIONS INTO SINGLE DOUBLE PUSH/POP STACK MICROINSTUCTION FOR EXECUTION

BACKGROUND OF THE INVENTION

1. Field of the Invention

This invention relates in general to the field of data processing in computers, and more particularly to an apparatus and method for performing double push/pop stack accesses with a single micro instruction.

2. Description of the Related Art

Software programs that execute on a microprocessor consist of macro instructions, which together direct the microprocessor to perform a function. Each instruction directs the microprocessor to perform a specific operation, which is part of the function, such as loading data from memory, storing data in a register, or adding the contents of two registers.

In a desktop computer system, a software program is typically stored on a mass storage device such as a hard disk drive. When the software program is executed, its constituent instructions are copied into a portion of random access memory (RAM). Present day memories in computer systems consist primarily of devices utilizing dynamic RAM (DRAM) technologies.

Early microprocessors fetched instructions and accessed associated data directly from DRAM because the speed of these microprocessors was roughly equivalent to the DRAM speed. In more recent years, however, improvements in microprocessor speed have far outpaced improvements in DRAM speed. Consequently, today's typical processing system contains an additional memory structure known as a cache. The cache is used to temporarily store a subset of the instructions or data that are in DRAM. The cache is much faster than the DRAM memory, but it is also much smaller in size. Access to a memory location whose data is also present in the cache is achieved much faster than having to access the memory location in DRAM memory.

Cache memory is typically located between main memory (i.e., DRAM memory) and the microprocessor. In addition, some microprocessors incorporate cache memory on-chip. Wherever the cache resides, its role is to store a subset of the instructions/data that are to be processed by the microprocessor.

When a processing unit in a microprocessor requests data from memory, the cache unit determines if the requested data is present and valid within the cache. If so, then the cache unit provides the data directly to the processing unit. This is known as a cache hit. If the requested data is not present and valid within the cache, then the requested data must be fetched from main memory (i.e., DRAM) and provided to the processing unit. This is known as a cache miss.

Structurally, a cache consists of a number of cache lines, a typical cache line being 32-bytes in length. Each cache line is associated with, or mapped to, a particular region in main memory. Thus, when a cache miss happens, the entire cache line is filled, that is, multiple locations in memory are transferred to the cache to completely fill the cache line. This is because large blocks of memory can be accessed much faster in a single access operation than sequentially accessing smaller blocks.

In addition, typical microprocessor operands range in size from one byte to eight bytes. But, for a cache to provide the capability to selectively address and transfer individual bytes of data would require the addition of complex and costly hardware to a microprocessor design. To simplify cache designs, a present day processing unit within a microprocessor accesses cache lines in subdivisions called cache sub-lines. Thus, when a processing unit accesses an operand at a given memory address, the entire cache sub-line to which the operand is mapped is accessed by the processing unit; data logic in the processing unit places the operand at its specified location within the cache sub-line. Typical cache sub-lines are eight bytes in length. For instance, an instruction directing access to a 4-byte operand would result in access to the operand's associated 8-byte cache sub-line. Hence, by fixing the size of a cache line access to be equal to the size of a cache sub-line, microprocessor designers are able to produce designs which are less complex and costly.

In general, accessing a larger amount of data than what is really required in a single access does not impose a burden on microprocessor performance. Typically, only one cycle of a microprocessor clock is required to access an entire cache sub-line and locate an operand within it. Yet, microprocessor designers continue to be challenged to produce microprocessor designs having execution speed, without having increased power consumption, complexity, or cost.

One approach to improving the overall execution speed of a design is to improve the execution efficiency of particular frequently used instructions. Frequently used instructions are those instructions which are found in significant quantities within a meaningful number of application programs. By bettering performance of frequently used instructions, the overall performance of a microprocessor is notably improved.

Most present day microprocessors provide instructions to store/retrieve data to/from a common data structure known as a stack. These instruction are called stack access instructions. A stack is a data structure occupying a designated location in memory. The stack is used to pass operands between application programs, or between subroutines within a given application program. A stack structure is unique in the sense that locations within the stack are prescribed with reference to a top of stack location, which is maintained by register logic within a microprocessor. Hence, to place operands on the stack or to retrieve operands from the stack, an application need only reference the current top of stack location. When a stack access instruction is executed, a top of stack pointer register in the microprocessor is automatically incremented or decremented to adjust the top of stack accordingly.

Two frequently used stack access instructions are PUSH and POP. A PUSH instruction directs a microprocessor to store an operand at the current top of stack. A POP instruction directs the microprocessor to retrieve an operand from the current top of stack. The PUSH and POP instructions are the instructions most commonly employed to pass operands between application programs as described above. Moreover, in desktop applications, it is highly likely to find sections of a given application program wherein several sequential PUSH or POP instructions are executed. This is because, rather than passing a single operand, desktop applications normally pass several operands on the stack. Furthermore, the architecture for addressing operands within a stack, i.e., with reference to the top of stack, dictates that successive stack access will indeed access adjacently located operands in the stack. Consequently, it is not uncommon to observe instances in a given application program where the execution of sequential stack access instructions results in repeated access to a particular cache sub-line. Although two operands may reside within the particular cache sub-line, the stack access instructions themselves only prescribe a single access to a single operand.

Repeatedly accessing the same cache sub-line to store/retrieve data prescribed by successive stack access instructions truly is an inefficient use of microprocessor resources which manifests itself in unnecessary program delays. In particular, the execution of repeated PUSH/POP instructions in a present day microprocessor wastes a great deal of valuable execution time because it is highly probable that at least two successive PUSH/POP instructions will result in access to the same cache sub-line. One skilled in the art will appreciate that performance of a microprocessor can be significantly improved by combining successive accesses to the same cache sub-line into a single access.

Therefore, what is needed is a microprocessor capable of combining two access operations to access two operand prescribed by two successive stack access instructions into a single access to a cache sub-line to access the two operands.

In addition, what is needed is an apparatus in a microprocessor to combine two sequential push/pop instructions into a double push/pop micro instruction which executes during a single instruction cycle.

Moreover what is needed is a method for combining multiple sequential stack accesses in a microprocessor into a single operation, where the single operation is performed in one instruction cycle.

SUMMARY

To address the above-detailed deficiencies, it is an object of the present invention to provide a microprocessor for combining successive stack access operations into a single access to a cache sub-line to access two operands prescribed by two successive stack access instructions.

Accordingly, in the attainment of the aforementioned object, it is a feature of the present invention to provide a microprocessor for accessing a stack. The microprocessor has a translator and access alignment logic. The translator receives a first stack access instruction and a second stack access instruction, and decodes the first and second stack access instructions into a double access micro instruction. The double access micro instruction directs the microprocessor to accomplish both accesses prescribed by the first and second stack access instructions during a combined access. The access alignment logic is coupled to the translator and indicates alignment of two data entities specified by the first and second stack access instructions. The combined access is precluded when the access alignment logic indicates that the data entities are misaligned.

An advantage of the present invention is that two successive stack access instruction execute in half the time of that provided by present day microprocessors.

Another object of the present invention is to provide an apparatus in a microprocessor for combining two sequential push/pop instructions into a double push/pop micro instruction which executes during a single instruction cycle.

In another aspect, it is a feature of the present invention to an apparatus in a microprocessor for accessing a stack. The apparatus has translation logic, access alignment logic, and data access logic. The translation logic receives a first stack access instruction and a second stack access instruction from an instruction queue, and decodes the first and second stack access instructions into a double access micro instruction. The double access micro instruction directs the microprocessor to accomplish both accesses prescribed by the first and second stack access instructions during a combined access. The access alignment logic is coupled to the translation logic and indicates alignment of two data entities within a cache for the combined access. The data access logic is coupled to the translation logic. The data access logic receives the double access micro instruction, and accomplishes the combined access within a single instruction cycle. The combined access is precluded when the access alignment logic indicates that the data entities are misaligned within the cache and the combined access is allowed when the access alignment logic indicates that the data entities are aligned within the cache.

In yet another aspect, it is a feature of the present invention to provide an apparatus in a microprocessor for accessing two data entities in a stack during a single instruction cycle. The apparatus includes a shadow stack pointer, a performance predictor, and an instruction decoder. The shadow stack pointer monitors a stack pointer in the microprocessor, and indicates a top of stack associated with a macro instruction prior to execution of the macro instruction. The performance predictor is coupled to the shadow stack pointer. The performance predictor indicates whether performing a double access to access the two data entities would result in an aligned access. The instruction decoder is coupled to the performance predictor. The instruction decoder translates two stack access macro instructions into a double access micro instruction when the performance predictor indicates that the double access would result in an aligned access. The double access micro instruction directs the microprocessor to access the two data entities as a combined access within a single instruction cycle.

Another advantage of the present invention is that application programs having successive push/pop instructions execute faster than has heretofore been provided.

Yet another object of the present invention is to provide a method for combining multiple sequential stack accesses in a microprocessor into a single operation, where the single operation is performed in one instruction cycle.

In a further aspect, it is a feature of the present invention to provide a method in a microprocessor for combining two stack accesses into a double access. The method includes predicting whether the double access would result in an aligned or misaligned cache access; if an aligned access is predicted, translating two stack access macro instructions into a double access micro instruction, the double access micro instruction directing the microprocessor to perform the double access in a single instruction cycle; and if a misaligned access is predicted, translating each of the two stack access macro instructions into an associated stack access micro instruction which directs the microprocessor to perform an single access to the stack in a single instruction cycle.

Yet another advantage of the present invention is that a cache sub-line does not have to be accessed twice in order to execute two sequential stack access instructions prescribing access to two operands within the cache sub-line.

BRIEF DESCRIPTION OF THE DRAWINGS

These and other objects, features, and advantages of the present invention will become better understood with regard to the following description, and accompanying drawings where.

DETAILED DESCRIPTION

Taking into consideration the above background on techniques for performing multiple push/pop operations in a microprocessor, several related art examples will now be described with reference to FIGS. 1 through 4. These examples illustrate how present day techniques for repeatedly accessing a stack structure unnecessarily cause delays in the execution of a program. Following this discussion, a detailed description of the present invention will be provided with reference to FIGS. 5 through 7. Use of the present invention allows two successive push or pop instructions to be combined into a single double push or double pop operation and also precludes doubling when such combination would result in a misaligned cache access.

Figure 1:
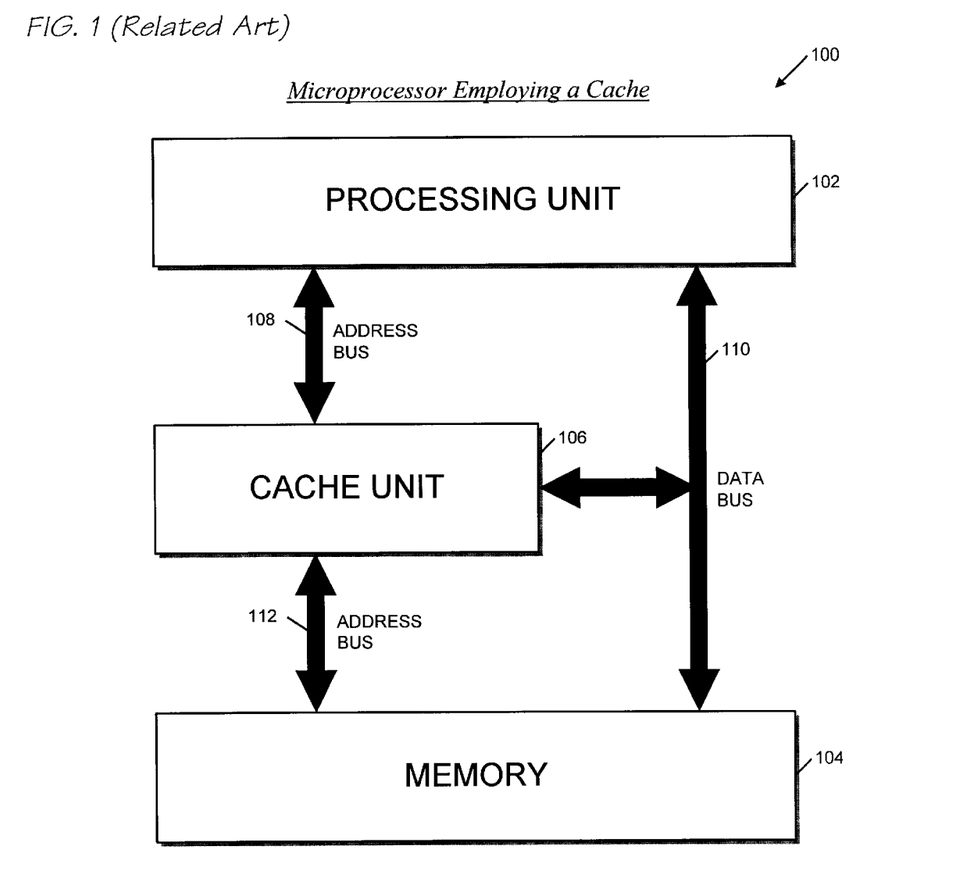
FIG. 1 is a block diagram of a related art microprocessor employing a cache.

Now referring to FIG. 1, a block diagram of a related art processing system 100 is shown. The processing system 100 includes a processing unit 102, connected to a memory 104 via a data bus 110. The processing system 100 also includes a cache unit 106. The cache unit 106 is connected to the processing unit 102 via both a processor address bus 108 and the data bus 110. The cache unit 106 is also connected to the memory 104 via a memory address bus 112 and the data bus 110.

Operationally, the processing unit 102 executes instructions that are stored in the memory 104. In addition, the processing unit 102 retrieves data from, or stores data to, the memory 104. To retrieve an instruction or access (i.e., store or retrieve) data, the processing unit 102 provides an address of a memory location on the processor address bus 108. The memory 104 accesses the memory location specified by the address and provides the contents of the memory location (i.e., the instruction or the data) to the processing unit 102 on the data bus 110.

As noted above, early microprocessors operated at approximately the same speed as their associated memory devices. Hence, instructions and data were fetched directly from dynamic random access memory (DRAM) or read-only memory (ROM) without incurring disproportionate delays. Today, a typical microprocessor operates almost an order of magnitude faster than those more economical memory technologies. Now, when instructions or data are fetched directly from main memory 104, the processing unit 102 is forced to wait until the memory 104 can provide the requested data.

Whether the consequent wait is acceptable or unacceptable depends upon the application of the microprocessor. For example, a microprocessor in a microwave oven, which is used to control the temperature in an enclosure to cook food, would not be affected negatively by having to wait on data from memory 104. The operations it performs are simple; they do not require access to data any faster than DRAM or ROM can typically provide. On the other hand, a microprocessor in a desktop computer system operates in an application environment where speed is significant; it is unacceptable to wait for data each time a memory access is required.

To overcome the wait associated with accessing data from slower memory devices, a conventional processing system 100 retains a copy of frequently accessed data from memory 104 in a cache unit 106. The cache 106 is much faster than the memory 104. Although data can be accessed in a cache 106 much faster than from memory 104, the capacity of the cache 106 is less than that of the memory 104. For this reason, software and hardware within the processing system 100 operate together to insure that frequently accessed data in memory 104 are present in the cache unit 106 so that the processing unit 102 does not have to wait for the data, either to retrieve data entities or to store data entities.

In operation, the cache unit 106 reads the address provided by the processing unit 108, and determines if the requested data is both present and valid within the cache unit 106. The case where the requested data is present and valid within the cache unit 106 is referred to as a cache hit. In the event of a cache hit, the cache unit 106 provides the requested data to the processing unit 102 on the data bus 110, and does not forward the address to memory 104. The case where the requested data is not present and valid in the cache unit 106 is referred to as a cache miss. In a cache miss, the cache unit 106 forwards the address to the memory 104 over the memory address bus 112. The memory 104 then provides the requested data to the processing unit 102 over the data bus 110.

When a cache miss occurs, in addition to providing requested data to the processing unit 102, the memory 104 also provides a block of data, which includes the requested data, to the cache unit 106. This block of data, however, is not equal to the size of the requested data entity; it is equal to the size of a cache line, which is an architected subdivision of the cache 106. The size of a cache line is termed by some skilled in the art as its width, by others skilled in the art as its length. A typical cache line width is 32-bytes. For instance, when the processing unit 102 requests a doubleword (i.e., a 4-byte data entity) of data from a memory address that is not present in the cache 106, the resulting cache miss causes the entire 32-byte cache line associated with the requested memory address to be retrieved from memory 104. A cache 106 is updated from memory 104 in this manner because application programs predictably operate on data entities which are adjacently located in memory 104. Furthermore, since larger blocks of data can be transferred to/from memory 104 much faster than smaller blocks, it is doubly advantageous to an application program for the microprocessor 100 to update a cache 106 in blocks the size of a cache line.

In addition, typical data entities are greater than one byte in width. In an application program, storage of data in memory 104 generally conforms to an architected register size within the microprocessor 100. Today's microprocessors have registers sized for doublewords or quadwords (i.e., 8-byte data entities). Because of this, microprocessors are designed to access a cache line in subdivisions of the cache line called cache sub-lines. Present day cache sub-lines are, commensurately, sized to access doublewords or quadwords. Accordingly, data access logic within the microprocessor 100 is designed to access cache sub-lines in order to retrieve/store data entities. Hence, when a cache hit occurs, the complete cache sub-line containing the requested data is retrieved by the processing unit 102 from the associated cache line in the cache 106.

Yet, present day application programs do not simply require that the microprocessor 100 address and access a requested data entity. In addition, a number of architected protection mechanisms are extant within current day microprocessors to preclude erroneous or inadvertent access to memory 104. In an x86-compatible microprocessor 100, provided protection mechanisms include segment limits, access privileges, and page faults. A comprehensive discussion of protection mechanisms is beyond the scope of this patent, however, it is pertinent to note that each access to a memory address by the processing unit 102 must be validated in order to determine if all protection mechanisms invoked by the application program are satisfied to the extent that the access is allowed. A particular violation of a protection mechanism during a memory access causes the microprocessor 100 to perform a task corresponding to the particular violation. One skilled in the art will appreciate that such violations and their related tasks are referred to generally as exceptions and exception handlers. For the purposes of this patent, it is important only to note that inadvertent or erroneous memory accesses cause exceptions in a microprocessor 100.

Because the processing unit 102 accesses cache sub-lines to retrieve or store data entities, and because each individual access to cache 106 must be validated against applicable protection mechanisms, it is important to comprehend that the manner in which a given data entity is aligned within the cache 106 directly impacts the time required to access it. The concept of alignment and related affects is more specifically described with reference to FIG. 2.

Figure 2:
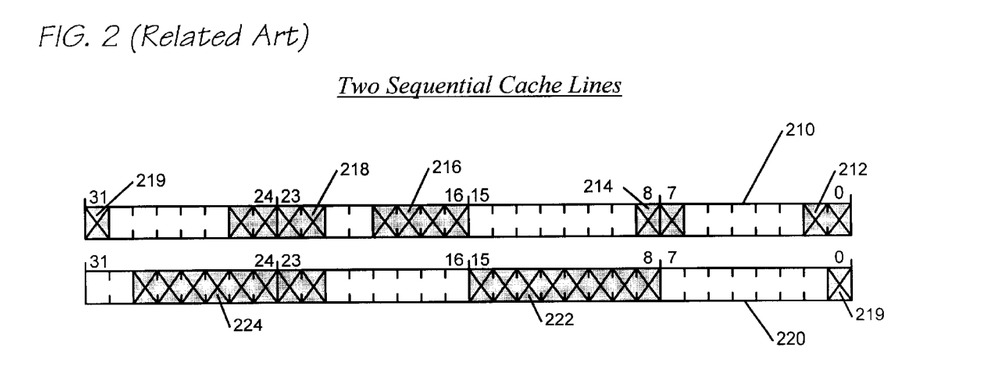
FIG. 2 is a diagram depicting data entities stored in various locations within two sequential cache lines.

Referring to FIG. 2, a diagram of a portion of a data cache 200 is presented illustrating two sequential 32-byte cache lines 210, 220. A data entity may be stored in any location within the cache lines 210, 220, provided that the data entity's constituent bytes are stored in adjacent byte locations within the cache 200. Byte 31 of line 210 is considered to be adjacent to byte 0 of line 220.

Although lines 210 and 220 each are 32 bytes wide, a microprocessor accesses cache sub-lines to retrieve or store requested data entities as described above. The following operational discussion is applies to a cache with 8-byte cache sub-lines.

To access a data entity in a cache typically requires one cycle of the microprocessor clock (i.e., one instruction cycle), if the requested data entity resides entirely within a single cache sub-line. When a data entity resides within a single cache sub-line, it is considered to be aligned within the cache. Access validation logic and data access logic in the microprocessor are configured to optimally perform accesses to aligned data entities. Such accesses are known as aligned accesses. If, however, a requested data entity does not reside entirely within a single cache sub-line, i.e., a first part of it resides in a first cache sub-line and a remaining part of it resides in an adjacent cache sub-line, then accessing the data entity is more complicated. When a data entity does not reside entirely within a single cache sub-line, it is considered to be misaligned within the cache. Because it crosses a cache sub-line boundary, then more than one instruction cycle is required to validate and access the data entity. Access of a misaligned data entity is called a misaligned access.

As noted above, an aligned access takes one instruction cycle. It follows then, that two aligned accesses require two instruction cycles. Yet, although access of a misaligned data entity (not exceeding 16 bytes in size, for this example) comprises access to only two cache sub-lines, the misaligned access indeed takes more than two instruction cycles. This is because the two cache sub-line accesses are not independent of each other. For the misaligned access to execute properly, protection mechanisms for both of the two cache sub-lines must be validated for access prior to retrieving or storing the data entity. To provide for otherwise could possibly result in the data entity being only partially retrieved or stored.

A common method for performing a misaligned access employs a technique called a tickle. A tickle performs all of the protection mechanism validation steps associated with a cache sub-line without actually accessing the data in the cache sub-line. Hence, to perform a misaligned access requires that a first cache sub-line be tickled. If the tickle passes, i.e., access to the first sub-line is validated, then a second cache sub-line is fully accessed, followed by full access of the first cache sub-line. Thus, three instruction cycles are required to perform a misaligned access: a first part tickle, a second part full access, and a first part full access. Several cases of data entity access from the data cache 200 will now be discussed to more fully illustrate. Although the following discussion is characterized in terms of data retrieval, one skilled in the art will concur that the discussion points are equally applicable to data storage.

A word 212 having a width of two bytes is shown within line 210. It is stored in byte positions 0 and 1 of line 210. It is aligned because it is completely stored within a single cache sub-line comprising bytes 0 through 7. Because it is aligned, it may be retrieved in one cycle.

A second word 214 is shown within the line 210. It is stored in byte positions 7 and 8. It is misaligned within line 210 because a first byte of the word 214 is stored within a cache sub-line comprising bytes 0 through 7 and a remaining second byte is stored within a following cache sub-line comprising bytes 8 through 15. Because the word is misaligned, it takes three instruction cycles to retrieve it.

A doubleword 216, having a length of four bytes, is stored in bytes 16 through 19 of line 210. It is aligned within a cache sub-line comprising bytes 16 through 23 of line 210. Because it is aligned, it may be loaded in one cycle.

A second doubleword 218 occupies bytes 22 through 25 of line 210. Loading of the doubleword 218 requires three instruction cycles because it crosses a cache sub-line boundary marked by bytes 23 and 24 of line 210.

A word 219 occupies byte 31 of line 210 and byte 0 of line 220. Because it is not completely stored within a single cache sub-line, it is misaligned. Loading of this data entity requires three instruction cycles.

A quadword 222, having a length of eight bytes, occupies byte positions 8 through 15 of line 220. Because it is aligned , it may be loaded in one instruction cycle.

A second quadword 224 occupies bytes 22 through 29 of line 220. Loading of quadword 224 requires three machine cycles because it crosses a cache sub-line boundary marked by bytes 23 and 24 of line 220.

With the above background on aligned/misaligned accesses within a cache, a problem associated with repeatedly accessing a data structure employed by virtually all application programs will now be discussed with reference to FIG. 3.

Figure 3:
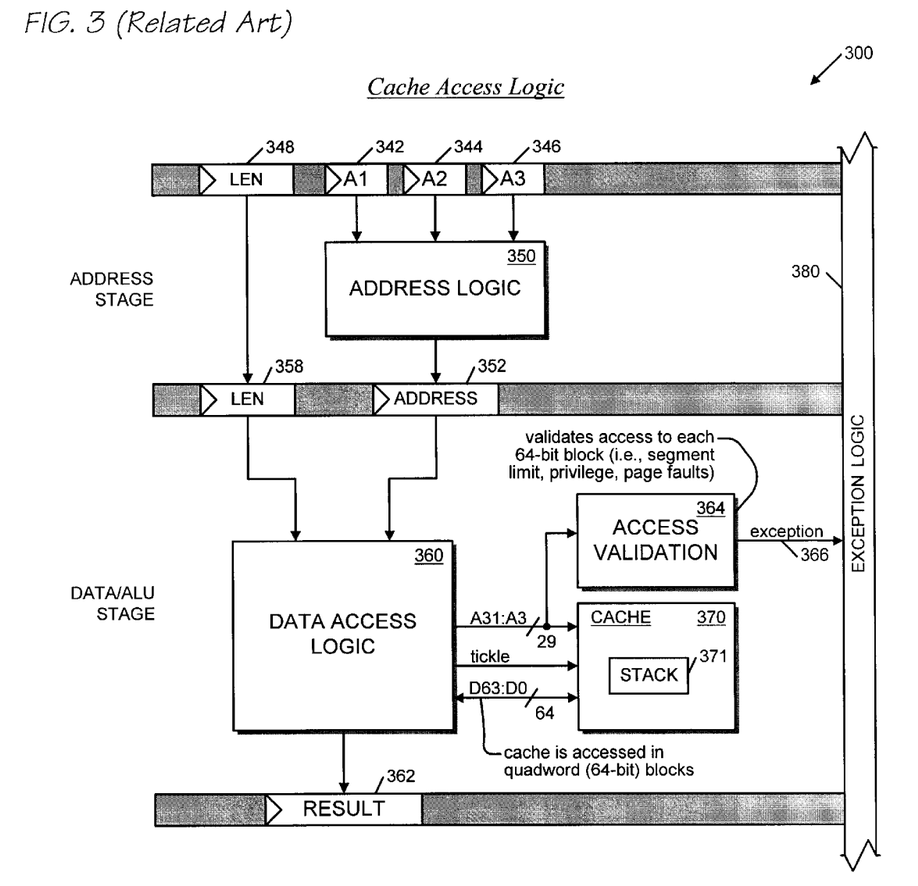
FIG. 3 is a block diagram of a portion of a related art pipeline microprocessor for accessing data entities within a cache.

Referring to FIG. 3, a block diagram of a portion of a related art pipeline microprocessor 300 for accessing data entities within a cache is presented. The microprocessor includes an address stage, for calculating an address of a requested data entity, and a data/ALU stage, for accessing the requested data entity. The address stage has address logic 350 connected to three address component registers 342, 344, 346. The address logic 350 provides an output to an address register 352. The data/ALU stage has data access logic 360, connected to access validation logic 364. The data access logic 360 is also connected to a cache 370 containing a stack 371. The data access logic 360 provides an output to a result register 362. The access validation logic is connected to exception logic 380.

In operation, a micro instruction, generated by a translator (not shown), or instruction decoder, in the microprocessor 300, prescribes address components used to calculate a memory address of a data entity. These address components are either directly specified by the micro instruction, or they are indirectly specified by referring to registers within a register file (not shown), which contain the address components. Various addressing methods exist, to include a mixture of direct and indirect address component specification. The micro instruction additionally prescribes the operation to be performed such as storage or retrieval. Furthermore, the micro instruction prescribes the size of the data entity to be accessed.

During execution of a micro instruction directing access to a particular data entity, logic in a preceding pipeline stage (not shown) provides the address components for the particular data entity in the three address component registers 342, 344, 346. In addition, the size of the data entity to be accessed is provided in a length register 348. The address logic 350 retrieves the address components from registers 342, 344, 346 and computes the address of the data entity in memory (not shown). The address is provided to the address register 352. In addition, the size of the data entity is forwarded to register 358.

Data access logic 360 retrieves the computed address from the address register 352 and the size from register 358. As described earlier, the data access logic 360 is configured to optimally perform accesses to aligned data entities. If the data access logic 360 finds that an access of the size specified in register 358 to the computed address would result in an aligned access, then the address of the cache sub-line containing the data entity is provided to the access validation logic 364 and the cache 370. The protection mechanism checks are performed by the access validation logic 364 during the same instruction cycle that the cache sub-line is accessed in the cache 370. If the access is valid, then the data entities in the complete cache sub-line are accessed. Results of data loads from the cache sub-line are placed in the result register 362. A store operation writes a provided operand to the cache sub-line. The operand is provided to the data access logic 360 in an operand register (not shown) by previous stages in the microprocessor pipeline. Invalid cache sub-line accesses cause the access validation logic 364 to signal an exception to the exception logic 380 via bus 366. As described above, exceptions cause the microprocessor 300 to perform a task, outside of normal program flow, according to the nature of the particular exception indicated. For example, an access privilege exception would cause the microprocessor 300 to perform a task which would inform the application program that an access privilege has occurred.

If the data access logic 360 finds that an access of the size specified in register 358 to the computed address would result in a misaligned access, then a first address of a first cache sub-line containing a first part of the data entity is provided to the access validation logic 364. The first address is provided to the cache 370 along with a tickle signal, directing the cache 370 to not access the first cache sub-line. The protection mechanism checks for the first cache sub-line are performed by the access validation logic 364 during a first instruction cycle. If access to the first cache sub-line is not valid, then the access operation ends by signaling an exception. If access to the first cache sub-line is valid, then a second address of a second cache sub-line containing a second part of the data entity is provided to the access validation logic 364. The second address is provided to the cache 370 without a tickle signal, thus directing the cache 370 to access the second cache sub-line. The protection mechanism checks for the second cache sub-line are performed by the access validation logic 364 during a second instruction cycle wherein contents of the second cache sub-line are accessed. During a third instruction cycle, the first cache sub-line is accessed in the same manner as is described for the second cache sub-line. Consequently, three cycles are required to access a misaligned data entity. One skilled in the art will appreciate that the first cache sub-line can be the cache sub-line containing the low-order part of the data entity or the cache sub-line containing the high-order part. Such mapping is a detail unique to a particular microprocessor design.

Virtually all of the automated tools used by software engineers to generate application programs ensure that data entities are aligned in memory according to the cache architecture of their target microprocessor. Because of this, misaligned accesses caused due to misaligned data entities are essentially nonexistent. Yet, increased processing demands in desktop applications continue to challenge microprocessor designers to improve the efficiency of fundamental operations within a microprocessor 300. One fitting example where such improvement is needed regards repeated accesses to a data structure known as a stack.

The stack 371 is particular data structure in memory that is used by an application program to pass operands, results, and other parameters to and from its constituent subroutines. The stack 371 exists at a defined memory location. Prior to transferring program control to a subroutine, the application program will store operands and related data for use by the subroutine in the stack 371. This is known as pushing data on to the stack 371. Following the stack push, program control is transferred to the subroutine. The subroutine may retrieve the operands from the stack 371 to perform its intended operation. Retrieval of operands from a stack 371 is known as a stack pop, or popping the stack 371. As the subroutine produces results, the results are pushed on to the stack 371 and program control is returned to the application program. The application program then pops the results off of the stack 371.

In addition, subroutines in an application program may transfer control to other subroutines, thus resulting in a number of nested layers of program execution. The stack architecture is designed to accommodate such nesting by employing a stack pointer. The stack pointer is a simple register in a microprocessor that contains the address of the top of the stack 371, that is, the next available address for use in the stack 371. Within an x86-compatible microprocessor 300, when a stack push occurs, the stack pointer is first decremented by the width of the operand to be pushed, then the operand is written to the stack 371 at the address contained in the stack pointer. When a stack pop occurs, the operand is first retrieved from the stack 371 at the address indicated by the stack pointer, then the stack pointer is incremented by the width of the retrieved operand. For example, if the stack pointer is initially pointing to address F0h in memory, pushing a word (i.e., a data entity two bytes in width) on to the stack 371 would first cause the stack pointer to be decremented to address EEh. The word would then be stored in locations EFh-EEh. Popping the word would cause retrieval of two bytes from the current top of stack 371, address EEh, followed by incrementing the stack pointer by two to equal F0h. Thus, nested program control transfers are accomplished in an x86-compatible microprocessor. Stack protection mechanisms limit the size of the stack 371 for a particular application program and also provide restrictions for access.

Stack usage is so prevalent today that most microprocessors provide a set of instructions to push and pop the stack 371. In an x86-compatible microprocessor 300, a PUSH macro instruction is used to push an operand on the stack 371 and a POP macro instruction is used to pop an operand off the stack 371. Specification of a source or target destination for the operand is provided by variants of the PUSH/POP macro instructions. For a POP instruction, the target destination may be a register in the microprocessor 300 or a memory location. The operand for a PUSH instruction may be provided immediately in the instruction itself, or it may be contained in a register in the microprocessor, or within a memory location. Variants of the PUSH and POP instructions also prescribe the size of the operand to be pushed or popped. Hence, an x86-compatible application will transfer control to one of its subroutines after executing a number of PUSH instructions to pass operands to the subroutine. Control is returned to the application program, which then retrieves the results of the operations performed by the subroutine by executing a number of POP instructions.

Instances of single PUSH/POP instructions are extremely rare in today's application programs. It is very common, however, to find more than one PUSH/POP instruction grouped together in an application program. And, recalling that each access to a memory address is performed at the cache sub-line level by data access logic 360 in the microprocessor 300, back-to-back stack accesses result in a significant amount of wasted instruction cycles. This is primarily because repeated cache sub-line accesses are being made to adjacently located memory addresses, but only to access one operand per cycle, at the expense of repeatedly accessing the same cache sub-line to access following operands. This is a problem. One skilled in the art will concur that improvements in the efficiency of repeated stack accesses by a microprocessor will result in an overall increase in the performance of virtually any application program. The problem associated with repeated stack accesses is addressed by the present invention.

The present invention exploits the fact that a program exhibits a plurality of adjacently located stack accesses by decoding pairs of like stack access instructions together into a single double stack access micro instruction that accesses two data entities in a single cache sub-line access, thereby improving overall program execution time. Because macro instructions in today's processors are provided to an instruction decoder via an instruction queue, to increase program execution speed, two successive PUSH/POP macro instructions in the instruction queue are translated into a single associated micro instruction, PUSH2/POP2, which performs both accesses to the stack prescribed by the two successive PUSH/POP instructions, in a single instruction cycle.

While the combination of successive PUSH/POP macro instructions is beneficial, in general, scenarios as can occur within an application program to cause overall performance degradation, such as when two aligned stack accesses are combined into a single stack access that is misaligned, that is, the individual data entities are aligned, but the combined data entity crosses a cache sub-line boundary. Were they to be executed as single stack accesses, the two associated PUSH/POP instructions would require only two cycles to access the two aligned data entities. But, because the two aligned data entities, when combined, would result in a misaligned access, such an access requires three instruction cycles, resulting in performance degradation. Thus, it is highly desirable to allow stack access combination when it results in a performance improvement, but combination should be precluded when it would adversely affect performance.

The present invention allows combination of two successive push/pop operations only when such combination could not negatively impact performance. An image of a stack pointer is maintained by a microprocessor within its translate stage. When successive PUSH/POP macro instructions are encountered, logic within the translate stage predicts the alignment of a potential combined access. Successive PUSH/POP macro instructions where combined access would yield positive performance results are decoded into a double PUSH/POP micro instruction, PUSH2/POP2. Successive PUSH/POP macro instructions where combined access would yield performance degradation are decoded individually into single PUSH/POP micro instructions. The present invention is more completely described with reference to FIG. 4.

Figure 4:
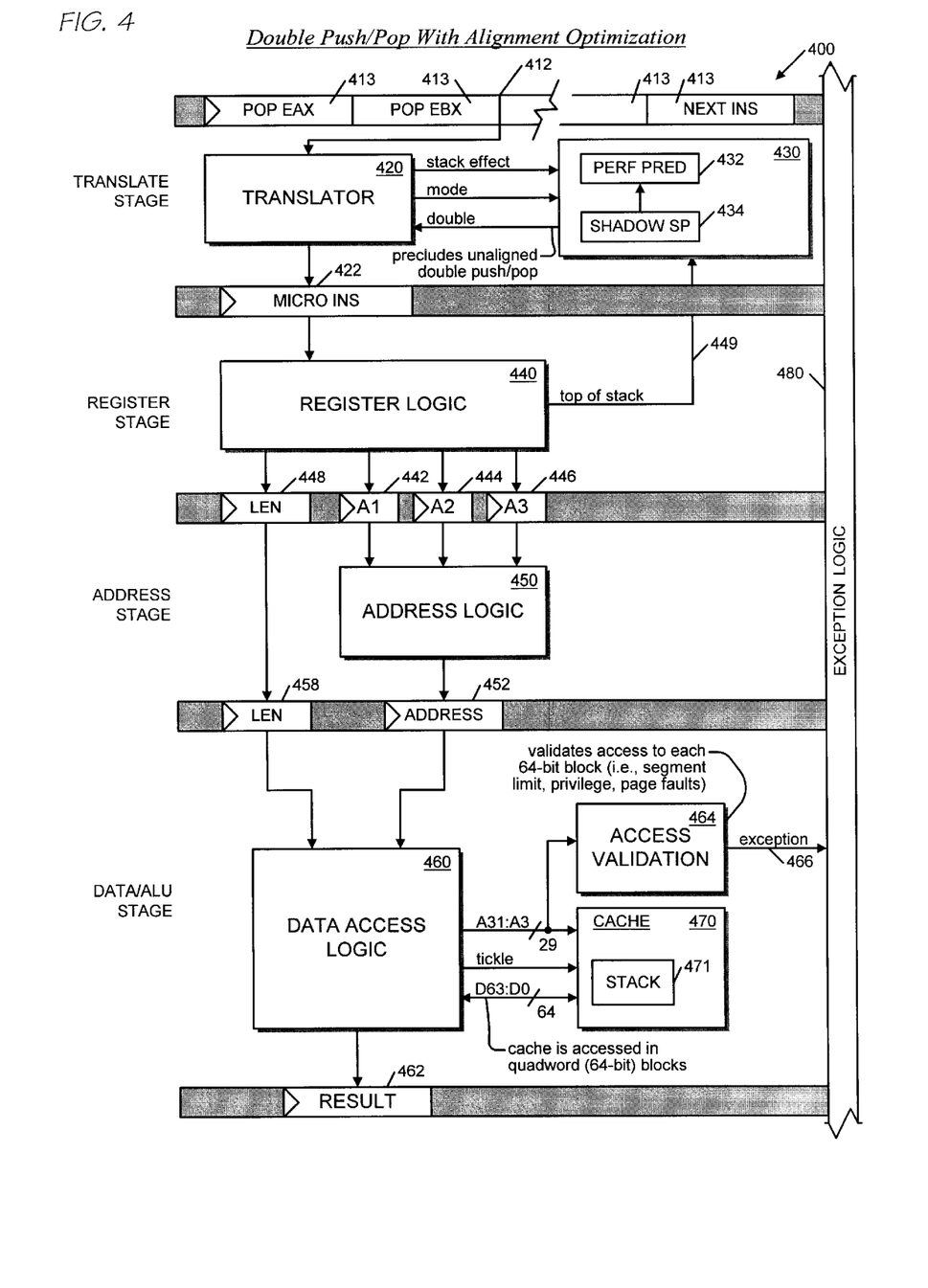
FIG. 4 is a block diagram of a pipeline microprocessor according to the present invention for performing multiple push/pop operations.

Now referring to FIG. 4, a block diagram of a pipeline microprocessor 400 according to the present invention is presented. The microprocessor 400 includes six pipeline stages: fetch (not shown), translate, register, address, data/ALU, and write back (not shown). The fetch stage fetches macro instructions from memory (not shown) that are to be executed by the microprocessor 400 and places them in a macro instruction queue 412. The translate stage includes a translator 420, which is connected to access alignment logic 430. The output of the translator is provided to a micro instruction register 422. The register stage has register logic 440 which provides outputs to three address component registers 442, 444, 446 and a length register 448. The address stage has address logic 450 providing an output to an address register 452. The data/ALU stage includes data access logic 460, which is connected to both a cache 470 and access validation logic 464. The cache contains a stack 471. The data access logic 460 provides an output to a result register 462. The access validation logic provides a signal to exception logic 480 via bus 466. The write back stage updates registers in the register logic 440 following using results contained in the result register 462. Micro instructions move through successive stages of the microprocessor pipeline in synchronization with a microprocessor clock.

Operationally, the macro instruction queue 412 comprises a number of macro instruction buffers 413, each containing macro instructions to be executed in sequence by the microprocessor 400. FIG. 4 shows a first pop instructions, POP EAX, in a first buffer 413, followed by a second pop instruction, POP EBX, in a second instruction buffer 413. The number of buffers 413 in the instruction queue 412 which can be accessed during a single instruction cycle by the translator is between one and ten. The translator 420 retrieves all of the instructions in the buffers 413 from the macro instruction queue 412 during a single instruction cycle.

Normally, the translator 420 decodes macro instruction sequentially into associated micro instructions. The micro instructions are then provided to the micro instruction buffer 422. The access alignment logic 430 includes a shadow stack pointer 434 and a performance predictor 432. The shadow stack pointer 434 is synchronized with the microprocessor's stack pointer (not shown), which is contained within the register logic 440. When a macro instruction affecting the stack pointer is encountered within the translate stage, the shadow stack pointer 434 is adjusted to reflect a new top of stack 471 resulting from proper execution of the macro instruction. The translator 420 provides signals to the access alignment logic 430 indicating effect of the macro instruction to the stack 471 and the microprocessor's mode of operation (i.e., 16-bit, 32-bit, etc.). As a result, the performance predictor 432 estimates alignment of a combined stack access which has yet to be translated. A signal is thus provided to the translator 420 indicating whether doubling of successive push/pop operations is allowed. If so, then the translator 420 combines two successive PUSH/POP macro instructions into a double PUSH/POP micro instruction, PUSH2/POP2. If the access alignment logic 430 estimates that doubling would result in performance degradation, then the translator individually decodes successive PUSH/POP macro instructions into associated single PUSH/POP micro instructions. The stack pointer contents are provided to the access alignment logic 430 via bus 449.

Micro instructions are retrieved from the micro instruction buffer 422 by the register logic 440. The register logic 440 retrieves operands prescribed by a micro instruction from a register file (not shown). PUSH/POP micro instructions cause the register logic to provide address components in registers 442, 444, and 446. The length of the PUSH/POP operand is provided in register 448. Thus, for a single PUSH/POP micro instruction, the register logic 440 provides address components for a single operand to the address component registers 442, 444, 446 along with its length in register 448. For a double PUSH/POP micro instruction, PUSH2/POP2, the register logic 440 provides address components for a combined data entity comprising first and second operands to the address component registers 442, 444, 446 along with its length in register 448.

The address logic 450 retrieves the address components and computes a memory address as described with reference to FIG. 3. The computed address is provided in register 452. In addition, the operand length is forwarded to register 458.

Data access logic 460 retrieves the computed address from the address register 452 and the length from register 458. If the data access logic 460 finds that an access of the size specified in register 458 to the computed address would result in an aligned access, then the address of the cache sub-line containing the data entity is provided to the access validation logic 464 and the cache 470. The protection mechanism checks are performed by the access validation logic 464 during the same instruction cycle that the cache sub-line is accessed in the cache 470. If the access is valid, then the data entities in the complete cache sub-line are accessed. Results of data loads from the cache sub-line are placed in the result register 462. A store operation writes a provided operand to the cache sub-line. The operand is provided to the data access logic 460 in an operand register (not shown) by previous stages in the microprocessor pipeline. Invalid cache sub-line accesses cause the access validation logic 464 to signal an exception to the exception logic 480 via bus 466. Misaligned accesses, requiring three cycles are performed in the same manner as that described with reference to FIG. 3.

When a PUSH2/POP2 micro instruction is executed according to the present invention, the data access logic 460 accesses two operands in the stack 471 during a single instruction cycle. Consequently, the data access logic 460 can push/pop two operands to/from the stack 471 in a single instruction cycle, that is, if the combination of the two operands result in an aligned access.

If the combination of the two operands prescribed by the PUSH2/POP2 micro instruction is aligned, then the time to perform the double push/pop operation is cut in half: one instruction cycle versus two instruction cycles. And, if the combination of the two operands prescribed by the PUSH2/POP2 micro instruction is unaligned, then two cycles are required to access the combined data entity. How the present invention combines stack accesses and resulting performance improvements are described with reference to FIG. 5.

Figure 5:
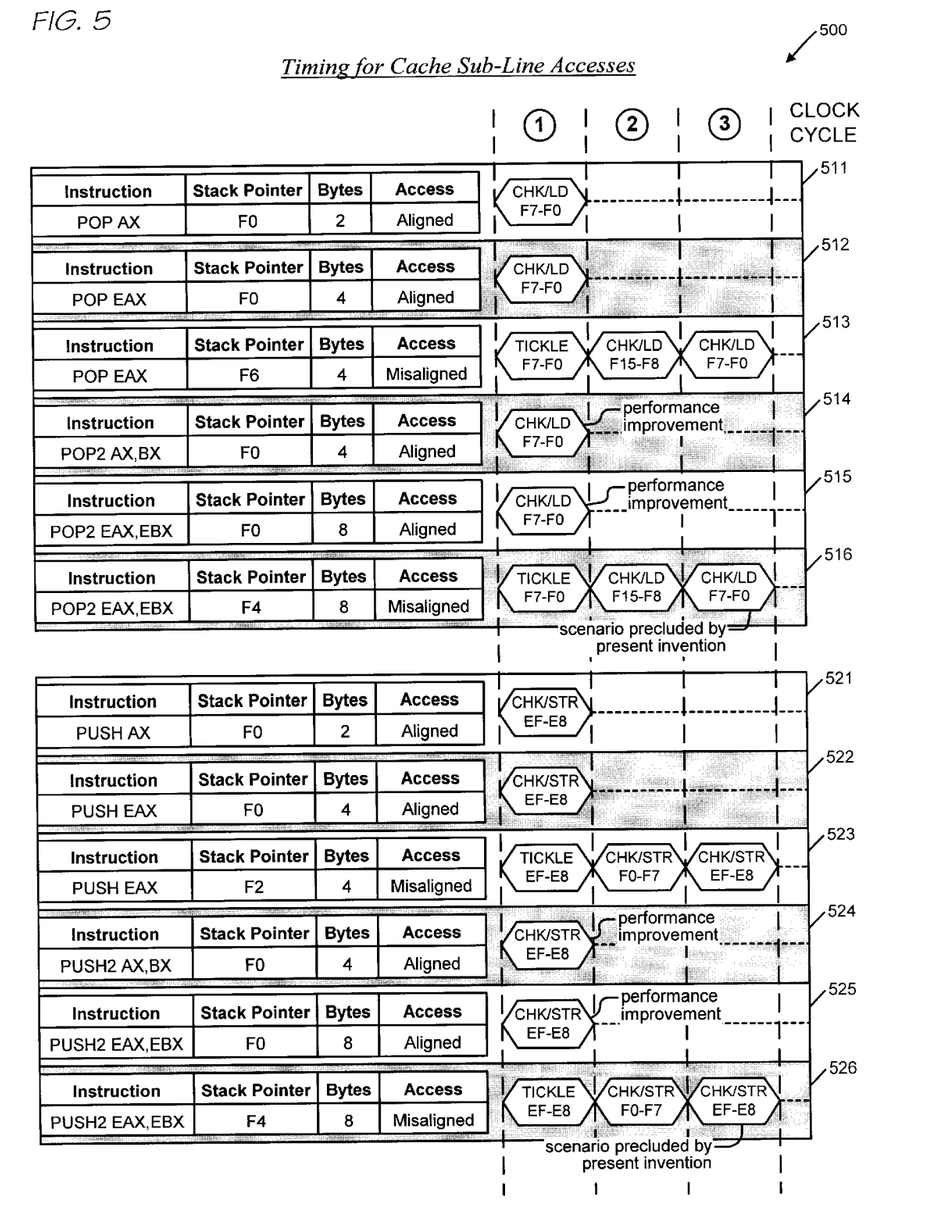
FIG. 5 is a timing diagram illustrating execution of POP and PUSH micro instructions by the microprocessor of FIG. 5 to access data entities in a stack.

FIG. 5 is a timing diagram 500 illustrating execution of POP and PUSH micro instructions by the microprocessor 400 of FIG. 4 to access data entities in the stack 471. Six pop scenarios are presented: an aligned 2-byte pop 511, an aligned 4-byte pop 512, a misaligned 4-byte pop 513, an aligned double pop 514 having a combined 4-byte length, an aligned double pop 515 having a combined 8-byte length, and a misaligned double pop 516 having a combined 8-byte length. The misaligned double pop scenario 516 is only shown for reference because such a scenario 516 is precluded by the present invention. Six push scenarios are presented: an aligned 2-byte push 521, an aligned 4-byte push 522, a misaligned 4-byte push 523, an aligned double push 524 having a combined 4-byte length, an aligned double push 525 having a combined 8-byte length, and a misaligned double push 526 having a combined 8-byte length. The misaligned double push scenario 526 is only shown for reference because such a scenario 526 is precluded by the present invention. Operations of the address stage of the microprocessor 400 are shown with respect to clock cycles, or instruction cycles. The following discussion presumes the stack 471 is located at address 00h in the cache 470 and the cache 470 is divided into 8-byte cache sub-lines. As a result, a data entity wholly contained within addresses 07h–00h is aligned. A data entity which is partially contained in the cache sub-line defined by addresses 07h–00h and is partially contained in the next cache sub-line defined by addresses 08h–0Fh is misaligned.

Referring to scenario 511, a pop micro instruction, designated POP AX, is provided to the address stage. The micro instruction directs the microprocessor 400 to perform a single pop operation from the stack 471 and place a 2-byte operand in register AX. Because the stack pointer indicates address F0h, the data access logic 460 determines that the access is aligned. As a result, during clock cycle 1, a cache sub-line address, F0h, is provided by the data access logic 460 to both the cache 470 and the access validation logic 464. Thus, the pop operation requires only one clock cycle to access the stack 471.

Referring to scenario 512, a pop micro instruction, designated POP EAX, is provided to the address stage. The micro instruction directs the microprocessor 400 to perform a single pop operation from the stack 471 and place a 4-byte operand in register EAX. Because the stack pointer indicates address F0h, the data access logic 460 determines that the access is aligned. As a result, during clock cycle 1, a cache sub-line address, F0h, is provided by the data access logic 460 to both the cache 470 and the access validation logic 464. Thus, the pop operation requires only one clock cycle to access the stack 471.

Referring to scenario 513, a pop micro instruction, designated POP EAX, is provided to the address stage. The micro instruction directs the microprocessor 400 to perform a single pop operation from the stack 471 and place a 4-byte operand in register EAX. But in this scenario 513, because the stack pointer indicates address F6h, the data access logic 460 determines that the access is misaligned. This is because the 4-byte operand targeted for register EAX is stored in addresses F9h–F6h, which crosses a cache sub-line boundary. As a result, during clock cycle 1, a first part tickle is performed by providing a first cache sub-line address, F0h, to the cache 470 along with a tickle signal. The first cache sub-line address is also provided to the access validation logic 464 so that access checks can be performed. During clock cycle 2, a second part full access is performed by providing a second cache sub-line address, F8h, to the cache 470 and the access validation logic 364. Finally, during clock cycle 3, a first part full access is performed by providing the first sub-line address, F0h, without the tickle signal, to both the cache 470 and the access validation logic 464. Thus, the misaligned pop operation requires three clock cycles to access the stack 471.

Referring to scenario 514, a double pop micro instruction, designated POP2 AX,BX, is provided to the address stage. Because the access alignment logic 430 predicts that a combined access will result in improved performance, translation of two successive POP macro instructions into the double pop micro instruction is allowed. The double pop micro instruction directs the microprocessor 400 to perform a 4-byte double pop operation from the stack 471 and place a 2-byte operand in register AX and a 2-byte operand in register BX. Because the stack pointer indicates address F0h, the access alignment logic 430 determines that the combined access is aligned, and thus allows translation into the double pop micro instruction to proceed. As a result, during clock cycle 1, a cache sub-line address, F0h, is provided by the data access logic 460 to both the cache 470 and the access validation logic 464. Thus, the 4-byte double pop operation requires only one clock cycle to access the stack 471.

Referring to scenario 515, a double pop micro instruction, designated POP2 EAX,EBX, is provided to the address stage. The micro instruction directs the microprocessor 400 to perform an 8-byte double pop operation from the stack 471 and place a 4-byte operand in register EAX and a 4-byte operand in register EBX. Because the stack pointer indicates address F0h, the access alignment logic 430 determines that the combined access is aligned, and thus allows translation into the double pop micro instruction to proceed. As a result, during clock cycle 1, a cache sub-line address, E8h, is provided by the data access logic 460 to both the cache 470 and the access validation logic 464. Thus, the 8-byte double push operation requires only one clock cycle to access the stack 471.

Scenario 516 illustrates a scenario which the present invention does not allow: a double pop micro instruction to access a misaligned combined data entity. The double pop micro instruction, designated POP2 EAX,EBX, directs the microprocessor 400 to perform an 8-byte double pop operation from the stack 471 and place a 4-byte operand in register EAX and a 4-byte operand in register EBX. But, because the shadow stack pointer 434 predicts that the combined access would be misaligned, translation of the two associated POP macro instructions into the double pop micro instruction is precluded. Rather, each of the two associated POP macro instructions is individually translated into a single POP micro instruction, whose execution only requires two instruction cycles. Otherwise, as the scenario 516 depicts, execution of the combined misaligned access would require three instruction cycles. This scenario 516 is precluded by the present invention.

It is significant to note that performance improvement is achieved when two successive pop operations can be combined into a single combined access that is aligned. Scenarios 514 and 515 demonstrate how combination results in access improvement. However, scenario 516 demonstrates how two pop operations, each alone having aligned operands, can result in a misaligned access when they are combined. And, while execution of the two pop operations individually would only require two clock cycles, combination of the two pops results in a combined access requiring three cycles. This is significant performance degradation when viewed in light of an application program having many nested levels of program control. For this reason, the misaligned double pop scenario 516 does not exist within a microprocessor 400 according to the present invention.

Referring to scenario 521, a push micro instruction, designated PUSH AX, is provided to the address stage. The micro instruction directs the microprocessor 400 to perform a single push operation to the stack 471 of the 2-byte contents of register AX. Because the stack pointer indicates address F0h, the data access logic 460 determines that the access is aligned. As a result, during clock cycle 1, a cache sub-line address, E8h, is provided by the data access logic 460 to both the cache 470 and the access validation logic 464. Thus, the push operation requires only one clock cycle to access the stack 471.

Referring to scenario 522, a push micro instruction, designated PUSH EAX, is provided to the address stage. The micro instruction directs the microprocessor 400 to perform a single push operation to the stack 471 of the 4-byte contents of register EAX. Because the stack pointer indicates address F0h, the data access logic 460 determines that the access is aligned. As a result, during clock cycle 1, a cache sub-line address, E8h, is provided by the data access logic 460 to both the cache 470 and the access validation logic 464. Thus, the push operation requires only one clock cycle to access the stack 471.

Referring to scenario 523, a push micro instruction, designated PUSH EAX, is provided to the address stage. The micro instruction directs the microprocessor 400 to perform a single push operation to the stack 471 of the 4-byte contents of register EAX. But in this scenario 523, because the stack pointer indicates address F2h, the data access logic 460 determines that the access is misaligned. This is because the 4-byte operand targeted for the stack 471 from register EAX is to be stored in addresses F1h–EEh, which crosses a cache sub-line boundary. As a result, during clock cycle 1, a first part tickle is performed by providing a first cache sub-line address, E8h, to the cache 470 along with a tickle signal. The first cache sub-line address is also provided to the access validation logic 464 so that access checks can be performed. During clock cycle 2, a second part full access is performed by providing a second cache sub-line address, F0h, to the cache 470 and the access validation logic 464. Finally, during clock cycle 3, a first part full access is performed by providing the first sub-line address, E8h, without the tickle signal, to both the cache 470 and the access validation logic 464. Thus, the misaligned push operation requires three clock cycles to access the stack 471.

Referring to scenario 524, a double push micro instruction, designated PUSH2 AX,BX, is provided to the address stage. The micro instruction directs the microprocessor 400 to perform a 4-byte double push operation to the stack 471 of the 2-byte contents of register AX combined with the 2-byte contents of register BX. Because the stack pointer indicates address F0h, the access alignment logic 430 determines that the combined access is aligned, and thus translation into the double push micro instruction is allowed to proceed. As a result, during clock cycle 1, a cache sub-line address, E8h, is provided by the data access logic 460 to both the cache 470 and the access validation logic 464. Thus, the 4-byte double push operation requires only one clock cycle to access the stack 471.

Referring to scenario 525, a double push micro instruction, designated PUSH2 EAX, EBX, is provided to the address stage. The micro instruction directs the microprocessor 400 to perform an 8-byte double push operation to the stack 471 of the 4-byte contents of register EAX combined with the 4-byte contents of register EBX. Because the stack pointer indicates address F0h, the access alignment logic 430 determines that the combined access is aligned, and thus translation into the double push micro instruction is allowed to proceed. As a result, during clock cycle 1, a cache sub-line address, E8h, is provided by the data access logic 460 to both the cache 470 and the access validation logic 464. Thus, the 8-byte double push operation requires only one clock cycle to access the stack 471.

Scenario 526 illustrates a scenario which the present invention does not allow: a double push micro instruction to access a misaligned combined data entity. The double push micro instruction, designated PUSH2 EAX,EBX, directs the microprocessor 400 to perform an 8-byte double push operation to the stack 471 of the 4-byte contents of register EAX combined with the 4-byte contents of register EBX. But, because the shadow stack pointer 434 predicts that the combined access would be misaligned, translation of the two associated push macro instructions into the double push micro instruction is precluded. Rather, each of the two associated push macro instructions is individually translated into a single push micro instruction, whose execution only requires two instruction cycles. Otherwise, as the scenario 526 depicts, execution of the combined misaligned access would require three instruction cycles. This scenario 526 is precluded by the present invention.

Figure 6:
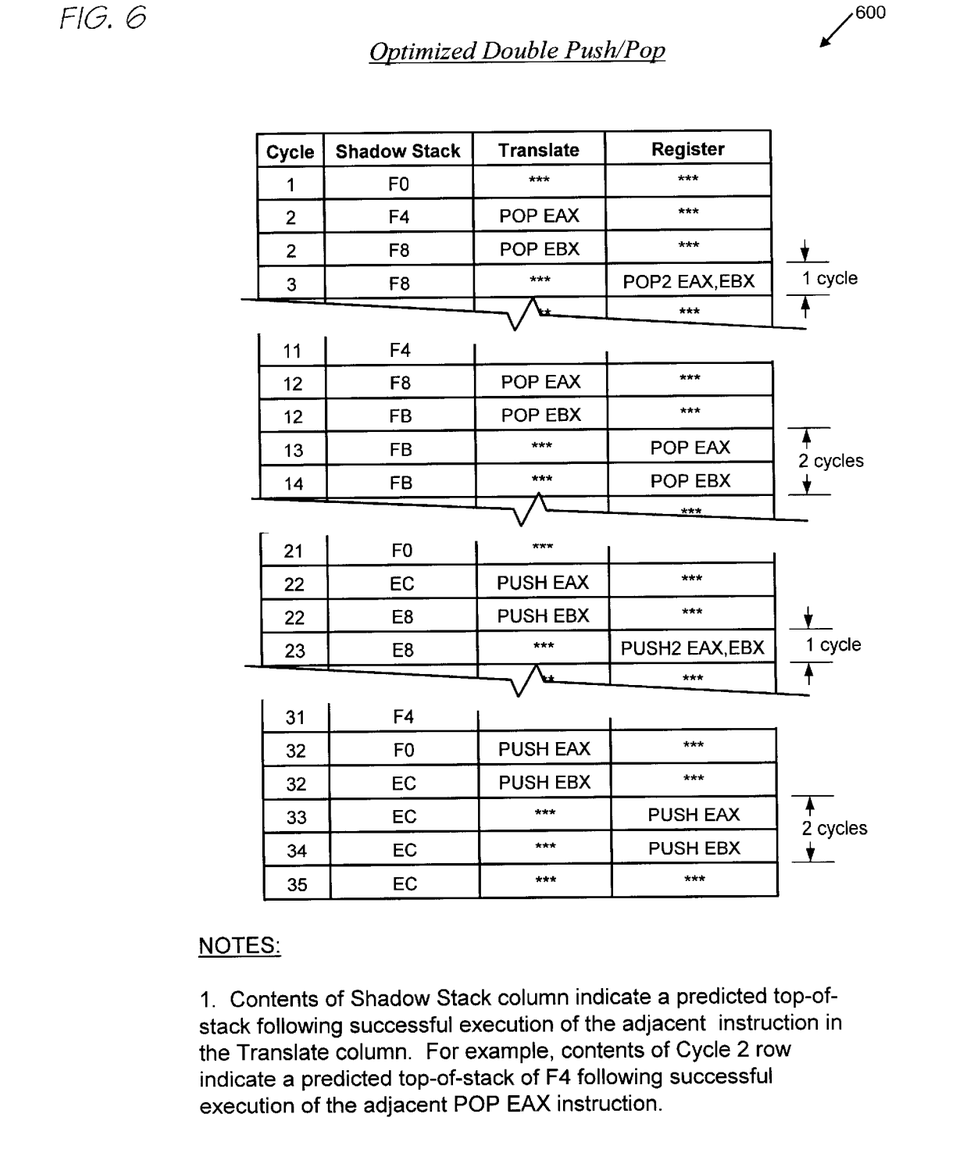
FIG. 6 is a table illustrating execution of multiple push/pop instructions by the microprocessor of FIG. 4.

It is also significant to note that performance improvement is achieved when two successive push operations are combined into a single combined access that is aligned. Scenarios 524 and 525 demonstrate how combination results in access improvement. However, scenario 526 demonstrates how two push operations, each alone having aligned operands, can result in a misaligned access when they are combined. And, while execution of the two push operations individually would only require only two clock cycles, combination of the two pushes results in a combined access requiring three cycles. Like the performance degradation seen with respect to combined pop operations above, the degradation due to combined misaligned push operations is only exacerbated when cast within an application program environment having many nested levels of program control. For this reason, the misaligned double push scenario 526 does not exist within a microprocessor 400 according to the present invention. FIG. 6 more particularly depicts how misaligned scenarios like scenarios 516 and 526 are avoided through employment of the present invention.

FIG. 6 is a table 600 illustrating execution of multiple push/pop instructions by the microprocessor 400 of FIG. 4. Progression of the instructions through the translate and register stages of the microprocessor 400 is shown with respect to cycles of a pipeline clock. Instructions before and after instructions of interest are designated by "***". Voids, or slips in the pipeline are designated by "--". For clarity, FIG. 6 only depicts those stages of the microprocessor pipeline that are relevant to how successive push/pop macro instructions are decoded and provided to the register stage.

During cycle 2, a first pop macro instruction proceeds through the translate stage. The first pop macro instruction is designated POP EAX. It directs the microprocessor 400 to retrieve a first 4-byte data entity from the stack 471 and place it into register EAX. Accordingly, the shadow stack pointer 434 indicates that proper execution of the instruction would result a new top of stack equal to F4h. Because the translator 420 expects to combine stack access instructions, in addition during cycle 2, a second pop macro instruction is fetched from the macro instruction queue 412. The second pop macro instruction is designated POP EBX. It directs the microprocessor 400 to retrieve a second 4-byte data entity from the stack 471 and place it into register EBX. Accordingly, the shadow stack pointer 434 indicates that proper execution of the instruction would result a new top of stack equal to F8h. As a result, the performance predictor 432 indicates that performance of the microprocessor 400 would be improved by combining the first and second pop macro operations into a single double pop operation. Consequently, the access alignment logic 430 signals the translator 420 to allow the combination.

During cycle 3, a double pop micro instruction proceeds through the register stage. The double pop micro instruction is designated POP2 EAX,EBX. It directs the microprocessor 400 to retrieve the first and second 4-byte data entities from the stack 471 during a single access to their associated cache sub-line. The first data entity is to be placed in register EAX and the second data entity is to be placed in register EBX. At this point, generation and provision of the double pop micro instruction is complete. As the diagram 600 shows, execution of the double pop micro instruction only requires one cycle of the pipeline clock.

Various other instructions are executed by the microprocessor 400 up through cycle 11 of the pipeline clock.

During cycle 12, a third pop macro instruction proceeds through the translate stage. The third pop macro instruction is designated POP EAX. It directs the microprocessor 400 to retrieve a third 4-byte data entity from the stack 471 and place it into register EAX. Accordingly, the shadow stack pointer 434 indicates that proper execution of the instruction would result a new top of stack equal to F8h. Because the translator 420 expects to combine stack access instructions, in addition during cycle 12, a fourth pop macro instruction is fetched from the macro instruction queue 412. The fourth pop macro instruction is designated POP EBX. It directs the microprocessor 400 to retrieve a fourth 4-byte data entity from the stack 471 and place it into register EBX. Accordingly, the shadow stack pointer 434 indicates that proper execution of the instruction would result a new top of stack equal to FBh. As a result, the performance predictor 432 indicates that performance of the microprocessor 400 would be degraded by combining the third and fourth pop macro operations into a single double pop operation. Consequently, the access alignment logic 430 signals the translator 420 to preclude the combination.

During cycle 13, a first single pop micro instruction proceeds through the register stage. The first single pop micro instruction is designated POP EAX. It directs the microprocessor 400 to retrieve the third 4-byte data entity from the stack 471 during a single access to its associated cache sub-line. The third data entity is to be placed in register EAX. At this point, generation and provision of the first single pop micro instruction is complete.

During cycle 14, a second single pop micro instruction proceeds through the register stage. The second single pop micro instruction is designated POP EBX. It directs the microprocessor 400 to retrieve the fourth 4-byte data entity from the stack 471 during a single access to its associated cache sub-line. The fourth data entity is to be placed in register EBX. At this point, generation and provision of the second single pop micro instruction is complete.

As the diagram 600 shows, execution of the two single pop micro instructions requires two cycles of the pipeline clock. Various other instructions are executed by the microprocessor 400 up through cycle 21 of the pipeline clock.

During cycle 22, a first push macro instruction proceeds through the translate stage. The first push macro instruction is designated PUSH EAX. It directs the microprocessor 400 to store in the stack 471 a fifth 4-byte data entity contained in register EAX. Accordingly, the shadow stack pointer 434 indicates that proper execution of the instruction would result a new top of stack equal to ECh. Because the translator 420 expects to combine stack access instructions, in addition during cycle 22, a second push macro instruction is fetched from the macro instruction queue 412. The second push macro instruction is designated PUSH EBX. It directs the microprocessor 400 to store in the stack 471 a sixth 4-byte data entity contained in register EBX. Accordingly, the shadow stack pointer 434 indicates that proper execution of the instruction would result a new top of stack equal to E8h. As a result, the performance predictor 432 indicates that performance of the microprocessor 400 would be improved by combining the first and second push macro operations into a single double push operation. Consequently, the access alignment logic 430 signals the translator 420 to allow the combination.

During cycle 23, a double push micro instruction proceeds through the register stage. The double push micro instruction is designated PUSH2 EAX,EBX. It directs the microprocessor 400 to retrieve the fifth and sixth 4-byte data entities from registers EAX and EBX and store them on the stack 471 during a single access to their associated cache sub-line. At this point, generation and provision of the double push micro instruction is complete. As the diagram 600 shows, execution of the double push micro instruction only requires one cycle of the pipeline clock.

Various other instructions are executed by the microprocessor 400 up through cycle 31 of the pipeline clock.

During cycle 32, a third push macro instruction proceeds through the translate stage. The third push macro instruction is designated PUSH EAX. It directs the microprocessor 400 to retrieve a seventh 4-byte data entity from register EAX and place it into the stack 471. Accordingly, the shadow stack pointer 434 indicates that proper execution of the instruction would result a new top of stack equal to F0h. Because the translator 420 expects to combine stack access instructions, in addition during cycle 12, a fourth push macro instruction is fetched from the macro instruction queue 412. The fourth push macro instruction is designated PUSH EBX. It directs the microprocessor 400 to retrieve an eighth 4-byte data entity from register EBX and place it into the stack 471. Accordingly, the shadow stack pointer 434 indicates that proper execution of the instruction would result a new top of stack equal to ECh. As a result, the performance predictor 432 indicates that performance of the microprocessor 400 would be degraded by combining the third and fourth push macro operations into a single double push operation. Consequently, the access alignment logic 430 signals the translator 420 to preclude the combination.

During cycle 33, a first single push micro instruction proceeds through the register stage. The first single push micro instruction is designated PUSH EAX. It directs the microprocessor 400 to store the seventh 4-byte data entity on the stack 471 during a single access to its associated cache sub-line. At this point, generation and provision of the first single push micro instruction is complete.

During cycle 34, a second single push micro instruction proceeds through the register stage. The second single push micro instruction is designated PUSH EBX. It directs the microprocessor 400 to store the eighth 4-byte data entity on the stack 471 during a single access to its associated cache sub-line. At this point, generation and provision of the second single push micro instruction is complete.

As the diagram 600 shows, execution of the two single push micro instructions requires two cycles of the pipeline clock.

The example of FIGS. 4 through 6 illustrate that significant performance improvements can be obtained through use of the current invention. Only one instruction cycle is required to access adjacently located data entities in a stack when combination results in an aligned access. When combination would otherwise result in an unaligned access, performance degradation, i.e., a 3-cycle access, is avoided. Up to 50 percent savings in execution time can be achieved over the example described with reference to FIG. 3. Hence, the problem of repeated stack accesses to adjacently located memory addresses is overcome through employment of the present invention.

Figure 7:
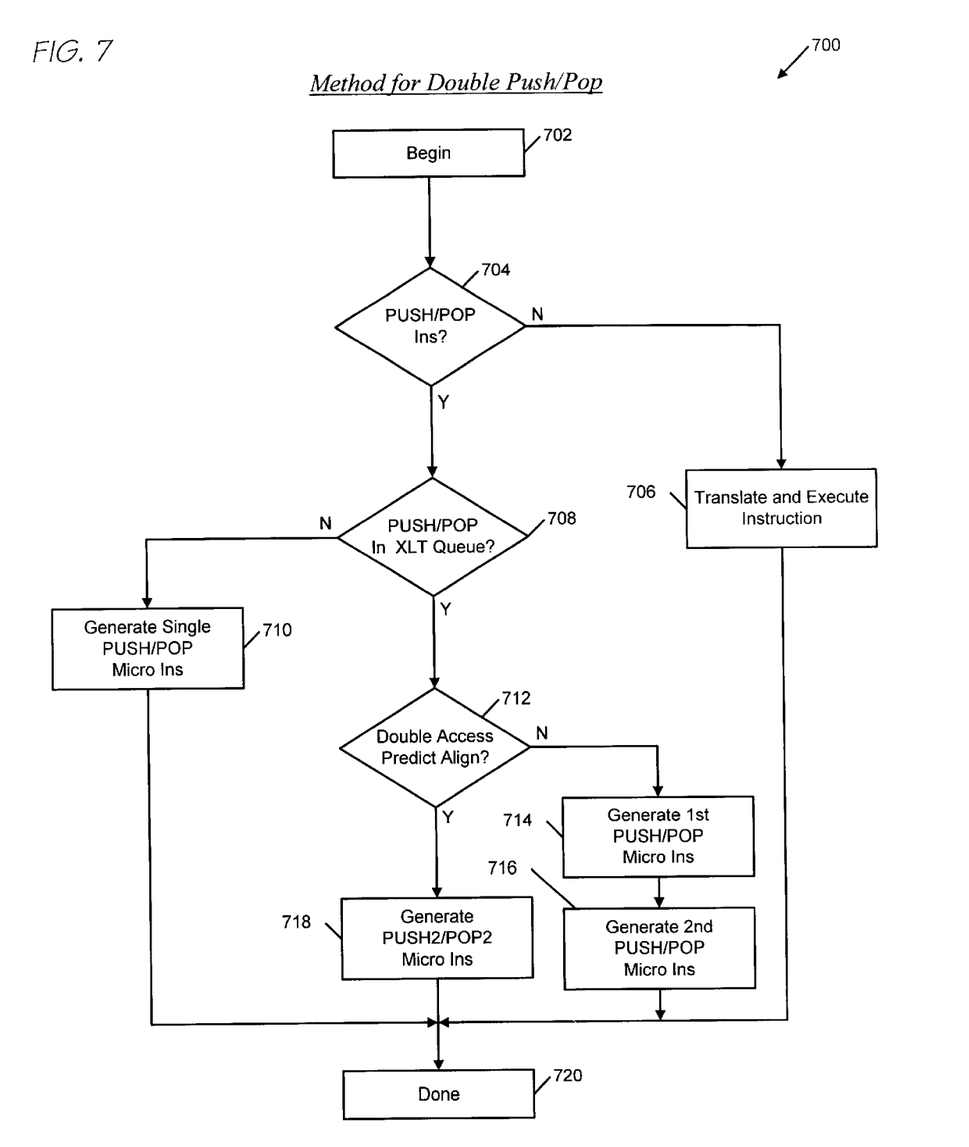
FIG. 7 is a flow chart illustrating a method according to the present invention for performing multiple push/pop operations in a pipeline microprocessor.

Now referring to FIG. 7, a flow chart 700 is presented illustrating a method according to the present invention for performing multiple push/pop operations in a pipeline microprocessor.

Flow begins at block 702 where a macro instruction is fetched from a macro instruction queue. Flow then proceeds to decision block 704.

At decision block 704, the macro instruction is evaluated to determine if it is a PUSH/POP instruction. If not, then flow proceeds to block 706. If it is a PUSH/POP instruction, then flow proceeds to decision block 708.

At block 706, the macro instruction is translated into an associated sequence of micro instructions. The associated sequence of micro instructions are sequentially provided to following stages in microprocessor pipeline for execution. Flow then proceeds to block 720.

At decision block 708, translate logic in the microprocessor determines if there is a first PUSH/POP macro instruction currently queued for the translator with which the fetched PUSH/POP macro instruction, a second PUSH/POP macro instruction, can be combined. If not, then flow proceeds to block 710. If so, then flow proceeds to decision block 712.

At block 710, since there is only a single PUSH/POP macro instruction queued up for the translator, fetched PUSH/POP macro instruction is decoded into a single associated PUSH/POP micro instruction. The single PUSH/POP micro instruction is provide to following stages in the microprocessor pipeline for execution. Flow then proceeds to block 720.

At decision block 712, access alignment logic in the microprocessor predicts whether a combined stack access of first and second data entities prescribed by the first and second PUSH/POP macro instructions would result in an aligned access, thus a performance improvement, or a misaligned access, thus a performance degradation. If combination would result in an aligned access, then flow proceeds to block 718. If combination would result in a misaligned access, then flow proceeds to block 714.

At block 718, the first and second PUSH/POP macro instructions are decoded into a single PUSH2/POP2 micro instruction directing the microprocessor to access both first and second data entities prescribed by the first and second PUSH/POP macro instructions during a single-cycle access to the cache sub-line to which they both are mapped. The PUSH2/POP2 micro instruction is provided to following stages of the microprocessor for execution. Flow then proceeds to block 720.

At block 714, the first PUSH/POP macro instruction is translated into a first associated PUSH/POP micro instruction directing the microprocessor to access the first data entity on the stack during a first instruction cycle. Flow then proceeds to block 716.

At block 716, the second PUSH/POP macro instruction is translated into a second associated PUSH/POP micro instruction directing the microprocessor to access the second data entity on the stack during a second instruction cycle. Flow then proceeds to block 720.

At block 720, the method completes.

Although the present invention and its objects, features, and advantages have been described in detail, other embodiments are encompassed by the invention. For example, the present invention has been particularly described in terms of a 32-byte cache line having 8-byte cache sub-lines. Although the described cache architecture is representative of present day technology, such an embodiment does not restrict the applicability of the present invention. The present invention comprehends any cache line and sub-line architecture to the extent that multiple stack operands can be combined in a single access to a cache sub-line.

In addition, the present invention has been specifically characterized as providing the capability to combine two push/pop operations into a single access operation by translating two PUSH/POP instructions into a double PUSH/POP instruction, PUSH2/POP2. Current microprocessor architectures support combining two operands into a single access, primarily due to register sizes as compared to cache sub-line sizes and macro instruction queue depth. In the future, it may be advantageous to have cache sub-line sizes much larger than what is seen today. As such, it would be possible to combine more than two PUSH/POP macro instructions into a single PUSHX/POPX micro instruction. The present invention anticipates such improvements. The PUSHX/POPX micro instruction would direct the microprocessor to access a single cache sub-line during a single instruction cycle to access multiple prescribed data entities.

Furthermore, the present invention has been characterized primarily with regard to accessing stack structures via a microprocessor. It is immaterial, however, from what host platform the access is performed. Rather, it can be performed upon any platform having an execution unit that repeatedly prescribes access to adjacently located operands as described herein to include signal processors, embedded controllers, array processors, and industrial controllers.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for accessing a stack, comprising:
 a translator, configured to receive a first stack access instruction and a second stack access instruction, and to decode said first and second stack access instructions into a double access micro instruction, said double access micro instruction directing the microprocessor to accomplish both accesses prescribed by said first and second stack access instructions during a combined access; and
 access alignment logic, coupled to said translator, configured to indicate alignment of two data entities specified by said first and second stack access instructions; wherein the combined access is precluded when said access alignment logic indicates that said data entities are misaligned.

2. The microprocessor as recited in claim 1, wherein said double access micro instruction directs the microprocessor to access a first data entity, prescribed by said first stack access instruction, and a second data entity, prescribed by said second stack access instruction.

3. The microprocessor as recited in claim 1, wherein said first and second stack access instructions are pop instructions, each directing the microprocessor to retrieve a data entity from the stack.

4. The microprocessor as recited in claim 3, wherein said double access micro instruction is a double pop micro instruction directing the microprocessor to retrieve said two data entities from the stack during the combined access.

5. The microprocessor as recited in claim 1, wherein said first and second stack access instructions are push instructions, each directing the microprocessor to place a data entity on the stack.

6. The microprocessor as recited in claim 5, wherein said double access micro instruction is a double push micro instruction directing the microprocessor to place said two data entities on the stack during the combined access.

7. The microprocessor as recited in claim 1, wherein said two data entities are aligned if they both are accessed within one clock cycle.

8. The microprocessor as recited in claim 7, wherein said two data entities are misaligned if their access requires more than one clock cycle.

9. The microprocessor as recited in claim 1, wherein, if said two data entities are misaligned, said translator decodes said first stack access instruction into a first stack access micro instruction and said second stack access instruction into a second stack access micro instruction.

10. The microprocessor as recited in claim 9, wherein said first stack access micro instruction directs the microprocessor to access a first data entity.

11. The microprocessor as recited in claim 9, wherein said second stack access micro instruction directs the microprocessor to access a second data entity.

12. The microprocessor as recited in claim 1, wherein said access alignment logic comprises:
 a shadow stack pointer, configured to monitor a stack pointer in the microprocessor, and to indicate a top of stack associated with a macro instruction prior to execution of said macro instruction;
 a performance predictor, coupled to said shadow stack pointer, configured to indicate whether performing the combined access would result in an aligned access.

13. An apparatus in a microprocessor for accessing a stack, comprising:
 translation logic, configured to receive a first stack access instruction and a second stack access instruction from an instruction queue, and to decode said first and second stack access instructions into a double access micro instruction, said double access micro instruction directing the microprocessor to accomplish both accesses prescribed by said first and second stack access instructions during a combined access;
 access alignment logic, coupled to said translation logic, configured to indicate alignment of two data entities within a cache for the combined access; and data access logic, coupled to said translation logic, configured to receive said double access micro instruction, and to accomplish the combined access within a single instruction cycle;

wherein the combined access is precluded when said access alignment logic indicates that said data entities are misaligned within said cache and the combined access is allowed when said access alignment logic indicates that said data entities are aligned within said cache.

14. The apparatus as recited in claim 13, wherein said associated micro instruction directs the microprocessor to access a first data entity, prescribed by said first stack access instruction, and a second data entity, prescribed by said second stack access instruction, during said single instruction cycle.

15. The apparatus as recited in claim 13, wherein said stack access instructions are pop instructions, each directing the microprocessor to retrieve a data entity from the stack.

16. The apparatus as recited in claim 15, wherein said double access micro instruction is a double pop micro instruction directing the microprocessor to retrieve said two data entities from the stack during the combined access.

17. The apparatus as recited in claim 13, wherein, if said two data entities are misaligned within said cache, said translation logic decodes a first stack access instruction into a first stack access micro instruction and a second stack access instruction into a second stack access micro instruction.

18. The apparatus as recited in claim 13, wherein said access alignment logic comprises:

a shadow stack pointer, configured to monitor a stack pointer in the microprocessor, and to indicate a top of stack associated with a macro instruction prior to execution of said macro instruction;

a performance predictor, coupled to said shadow stack pointer, configured to indicate whether performing said combined access would result in an aligned access.

19. An apparatus in a microprocessor for accessing two data entities in a stack during a single instruction cycle, the apparatus comprising:

a shadow stack pointer, configured to monitor a stack pointer in the microprocessor, and to indicate a top of stack associated with a macro instruction prior to execution of said macro instruction;

a performance predictor, coupled to said shadow stack pointer, configured to indicate whether performing a double access to access the two data entities would result in an aligned access; and an instruction decoder, coupled to said performance predictor, for translating two stack access macro instructions into a double access micro instruction when said performance predictor indicates that the double access would result in an aligned access, wherein said double access micro instruction directs the microprocessor to access the two data entities as a combined access within a single instruction cycle.

20. The apparatus as recited in claim 19, wherein said double access micro instruction directs the microprocessor to access a first data entity, prescribed by a first stack access macro instruction, and a second data entity, prescribed by a second stack access macro instruction, during the single instruction cycle.

21. The apparatus as recited in claim 20, wherein said shadow stack pointer provides said top of stack associated with successful execution of both of said first and second stack access macro instructions.

22. The apparatus as recited in claim 21, wherein said performance predictor, if said top of stack indicates that double access of said first and second data entities would result in a misaligned access, precludes said instruction decoder from translating said first and second stack access macro instructions into said double access micro instruction.

23. A method in a microprocessor for combining two stack accesses into a double access, comprising:

a) predicting whether the double access would result in an aligned or misaligned cache access;

b) if an aligned access is predicted by a), translating two stack access macro instructions into a double access micro instruction, the double access micro instruction directing the microprocessor to perform the double access in a single instruction cycle; and c) if a misaligned access is predicted by a), translating each of the two stack access macro instructions into an associated stack access micro instruction which directs the microprocessor to perform an single access to the stack in a single instruction cycle.

24. The method as recited in claim 23, wherein said predicting comprises:

(i) monitoring a stack pointer in the microprocessor to ascertain a current top of stack address;

(ii) estimating a new top of stack address based upon successful execution of two stack access macro instructions; and (iii) determining alignment within the cache of data entities for the double access using the new top of stack address provided by said estimating.

* * * * *